US012525094B1

(12) United States Patent
Georgilas

(10) Patent No.: US 12,525,094 B1
(45) Date of Patent: Jan. 13, 2026

(54) SYSTEMS AND METHODS FOR OPERATING A SYMBOL-COLLECTING GAMING MACHINE HAVING A PRIMARY GAME REEL MATRIX AND CORRESPONDING GAME BOARD MATRIX

(71) Applicant: Justin Tilemahos Georgilas, Las Vegas, NV (US)

(72) Inventor: Justin Tilemahos Georgilas, Las Vegas, NV (US)

(73) Assignee: Quantum IP, Las Vegas, NV (US)

( * ) Notice: Subject to any disclaimer, the term of this patent is extended or adjusted under 35 U.S.C. 154(b) by 397 days.

(21) Appl. No.: 18/160,845

(22) Filed: Jan. 27, 2023

(51) Int. Cl.
*G07F 17/32* (2006.01)

(52) U.S. Cl.
CPC ...... *G07F 17/3265* (2013.01); *G07F 17/3258* (2013.01); *G07F 17/3267* (2013.01)

(58) Field of Classification Search
CPC ........ G07F 17/34; G07F 17/32; G07F 17/326; G07F 17/3262; G07F 17/3265; G07F 17/3267; G07F 17/03
See application file for complete search history.

(56) References Cited

U.S. PATENT DOCUMENTS

| | | | | |
|---|---|---|---|---|
| 5,393,057 A * | 2/1995 | Marnell, II | G07F 17/3276 | 463/19 |
| 5,647,798 A * | 7/1997 | Falciglia | G07F 17/34 | 463/19 |
| 5,833,537 A * | 11/1998 | Barrie | G07F 17/3265 | D21/370 |
| 6,461,241 B1 * | 10/2002 | Webb | G07F 17/32 | 463/19 |
| 2002/0045472 A1 * | 4/2002 | Adams | G07F 17/3244 | 463/19 |
| 2003/0064785 A1 * | 4/2003 | Stone | G07F 17/3267 | 463/20 |
| 2006/0189379 A1 * | 8/2006 | Pacey | G07F 17/3267 | 463/20 |
| 2009/0075722 A1 * | 3/2009 | Louie | G07F 17/32 | 463/20 |
| 2021/0043038 A1 * | 2/2021 | Marks | G07F 17/3211 | |
| 2023/0316871 A1 * | 10/2023 | Marks | G07F 17/3293 | 463/20 |

* cited by examiner

*Primary Examiner* — Milap Shah
(74) *Attorney, Agent, or Firm* — FisherBroyles, LLP; Rob L. Phillips

(57) ABSTRACT

A system and method for operating a game of chance. The system and method involves using a game board matrix (i.e., secondary display or secondary display area) to collect certain symbols having appeared on a primary reel game matrix. Once a pre-established number or pattern of game board spaces are occupied with symbols, a prize is awarded to the player. In one version, prizes associated with symbols forming a winning outcome are aggregated and awarded. Once prizes have been awarded, the game board matrix is cleared of symbols.

20 Claims, 12 Drawing Sheets

400

SYSTEMS AND METHODS FOR OPERATING A SYMBOL-COLLECTING GAMING MACHINE HAVING A PRIMARY GAME REEL MATRIX AND CORRESPONDING GAME BOARD MATRIX

FIELD OF THE INVENTION

The embodiments of the present invention relate to systems and methods for collecting symbols from a reel game on a corresponding game board whereby once a pre-established number or pattern of game board spaces are occupied, a prize is awarded to the player.

BACKGROUND

Casinos derive much of their gaming revenue from electronic gaming machines such as slot machines. Unfortunately, even with the introduction of new technology (e.g., curved displays), slot machines and the like can become stale after even short game play sessions. Moreover, younger players do not tend to play traditional slot machines because they are not exciting or attractive to play. Therefore, as the player demographic continues to trend younger, new and exciting electronic games of chance are needed.

The slot machine bonus game is one of the seminal slot machine improvements in history. A bonus game is a secondary game triggered by the outcomes of the primary game. The most popular bonus game in history is the Wheel of Fortune slot machine. Wheel of Fortune includes a bonus wheel which is activated based on one or more pre-established primary game outcomes. Responsive to the bonus wheel being activated, the player is afforded the opportunity to spin the bonus wheel to win a bonus prize. The inclusion of the bonus wheel rendered the slot machine more exciting and entertaining. It is in this vein, that the industry must continue to advance.

Accordingly, the new system and method detailed herein involves using a game board matrix (i.e., secondary display or secondary display area) to collect certain symbols having appeared on the primary reel game matrix. Once a pre-established number or pattern of game board spaces are occupied with symbols, a prize is awarded to the player. In one embodiment, prizes associated with symbols forming a winning outcome are aggregated and awarded. Once prizes have been awarded, the game board matrix is cleared of symbols.

SUMMARY

In one embodiment of the present invention, a gaming machine includes a primary game display and secondary game display (or a single display having a primary game section and game board section) with the primary game display depicting a reel game and the secondary game display depicting a game board. The game board is a matrix of spaces matching the spaces forming the reel game. In one embodiment, the reel game and game board are 4×5 matrices of spaces. Other matrix types may be used with the embodiments of the present invention as long as the reel game and game board comprise a matrix with the same number of rows and columns.

During play of the primary reel game, symbols are randomly positioned in each space of the reel game matrix. If certain pre-established symbols are depicted on the reel game matrix, those certain pre-established reel game symbols (or a representation thereof) is displayed in the corresponding row and column of the matching game board matrix. If a number of game board spaces are occupied by symbols (4+ symbols in any row) or a pattern of symbols (X-shape) are occupied by symbols, a prize is awarded to the player. In one embodiment, the symbols incorporate prize amounts such that the prize awarded is the aggregate of the prizes incorporated in the symbols. Once a prize is awarded, the game board spaces are cleared of symbols.

Other variations, embodiments and features of the present invention will become evident from the following detailed description, drawings and claims.

DETAILED DESCRIPTION

Figure 1:
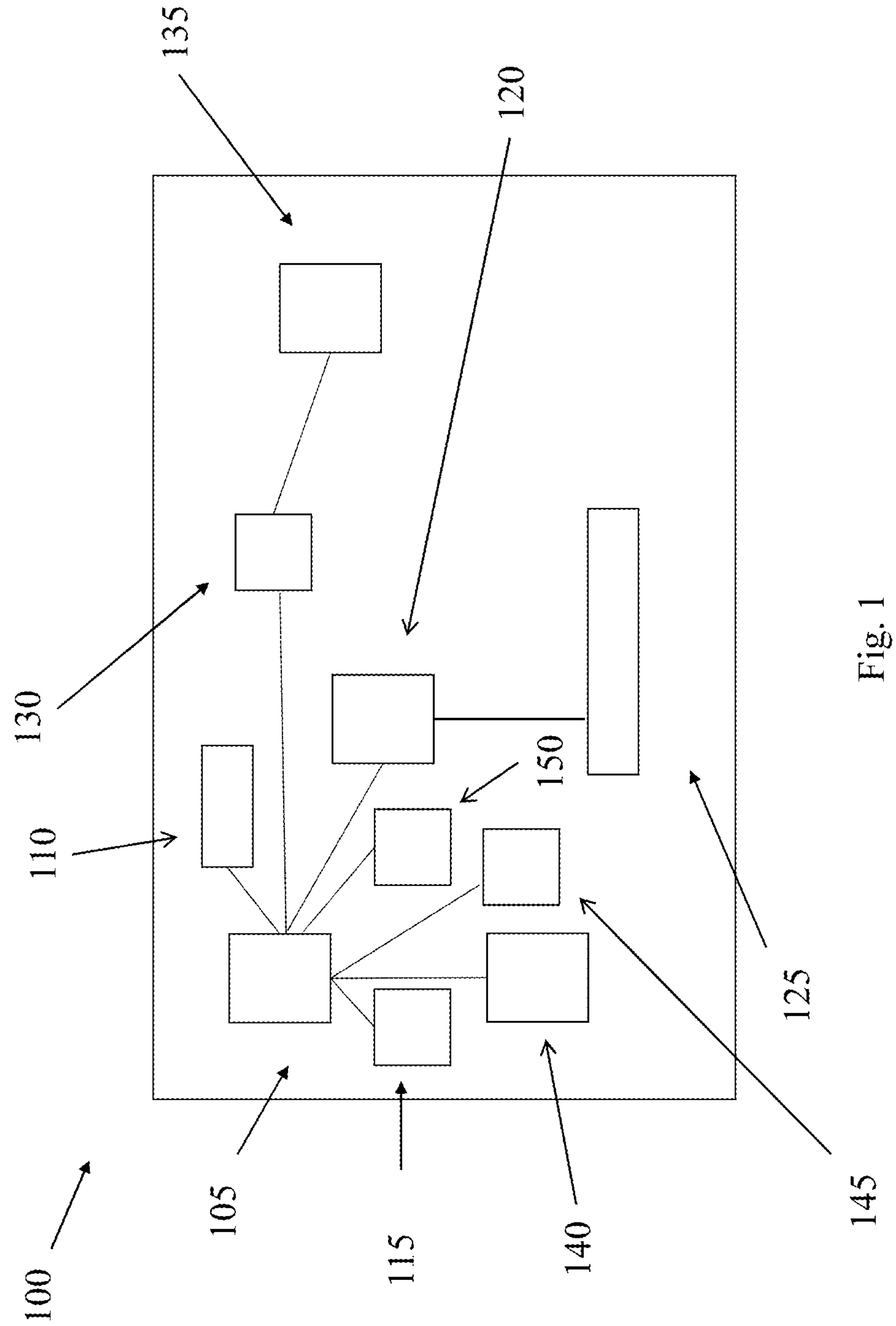
FIG. 1 illustrates a block diagram of components of an electronic gaming device for conducting a game according to the embodiments of the present invention.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

Those skilled in the art will recognize that the embodiments of the present invention involve both hardware and software elements which portions are described below in such detail required to construct and operate a game method and system according to the embodiments of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.), or an embodiment combining software and hardware. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), and optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied thereon, for example, in baseband or as part of a carrier wave. Such a propagated signal may take any variety of forms, including, but not limited to, electromagnetic, optical, or any suitable combination thereof. A computer readable signal medium may be any computer readable medium that is not a computer readable storage medium and that can communicate, propagate, or transport a program for use by or in conjunction with an instruction execution system, apparatus, or device.

Program code embodied on a computer readable medium may be transmitted using any appropriate medium, including but not limited to wireless, wireline, optical fiber cable, RF and the like, or any suitable combination of the foregoing.

Computer program code for carrying out operations for aspects of the present invention may be written in any combination of one or more programming languages, including an object-oriented programming language such as Java, Smalltalk, C++ or the like or conventional procedural programming languages, such as the "C" programming language, AJAX, PHP, HTML, XHTML, Ruby, CSS or similar programming languages. The programming code may be configured in an application, an operating system, as part of a system firmware, or any suitable combination thereof. The programming code may execute entirely on the user's computer, partly on the user's computer, as a stand-alone software package, partly on the user's computer and partly on a remote computer or entirely on a remote computer or server as in a client/server relationship sometimes known as cloud computing. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagrams. As used herein, a "gaming machine" or "gaming device" should be understood to be any one of a general purpose computer, as for example a personal computer, laptop computer, standalone machine, a client computer configured for interaction with a server, a special purpose computer such as a server, or a smart phone, soft phone, tablet computer, personal digital assistant or any other machine adapted for executing programmable instructions in accordance with the description thereof set forth above.

The embodiments of the present invention may be facilitated by an electronic gaming device whereby a single player plays against the electronic gaming device's (or machine's) processor as described herein. The electronic gaming device may be a standalone device and bar-top device forming part of a gaming device network or not. A block diagram of the electronic gaming device 100 is shown in FIG. 1. The exemplary electronic gaming device 100 may include a central processing unit (CPU) also deemed a processor 105 which controls the electronic gaming device 100 based on instructions stored in program read-only memory (ROM) 110 and pay table ROM 115. Program ROM 110 stores executable instructions related to the operation of the gaming device 100 and which are generally permanent. CPU 105 may be connected to a video controller 120 which provides output to one or more video displays 125. Similarly, an audio controller 130 provides audio output as dictated by the CPU 105 through speakers 135. The aforementioned components, and others, may be attached to a circuit board forming a motherboard. In another embodiment, the electronic gaming device 100 may be linked to a central game server which allows players to select from a number of games via the electronic gaming device 100. In such an embodiment, one or more processors integrated into the central server control the gaming device 100 based on instructions stored in program ROM 110.

A user interface 140 may respond to buttons on button panel or display incorporating touch screen technology or any other devices providing means for users to communicate with, and instruct, the electronic gaming device 100. Wager memory 145 stores an amount of money/credits deposited into the electronic gaming device 100 by a player and specific wager information related to each play of the electronic gaming device 100. Payout system 150 includes a coupon printer or similar device for receiving money/coupon from the electronic gaming device 100.

Those skilled in the art will recognize that the configuration and features of the electronic gaming device 100 disclosed herein are exemplary and may be altered in any number of ways without impacting the embodiments of the present invention.

Figure 2:
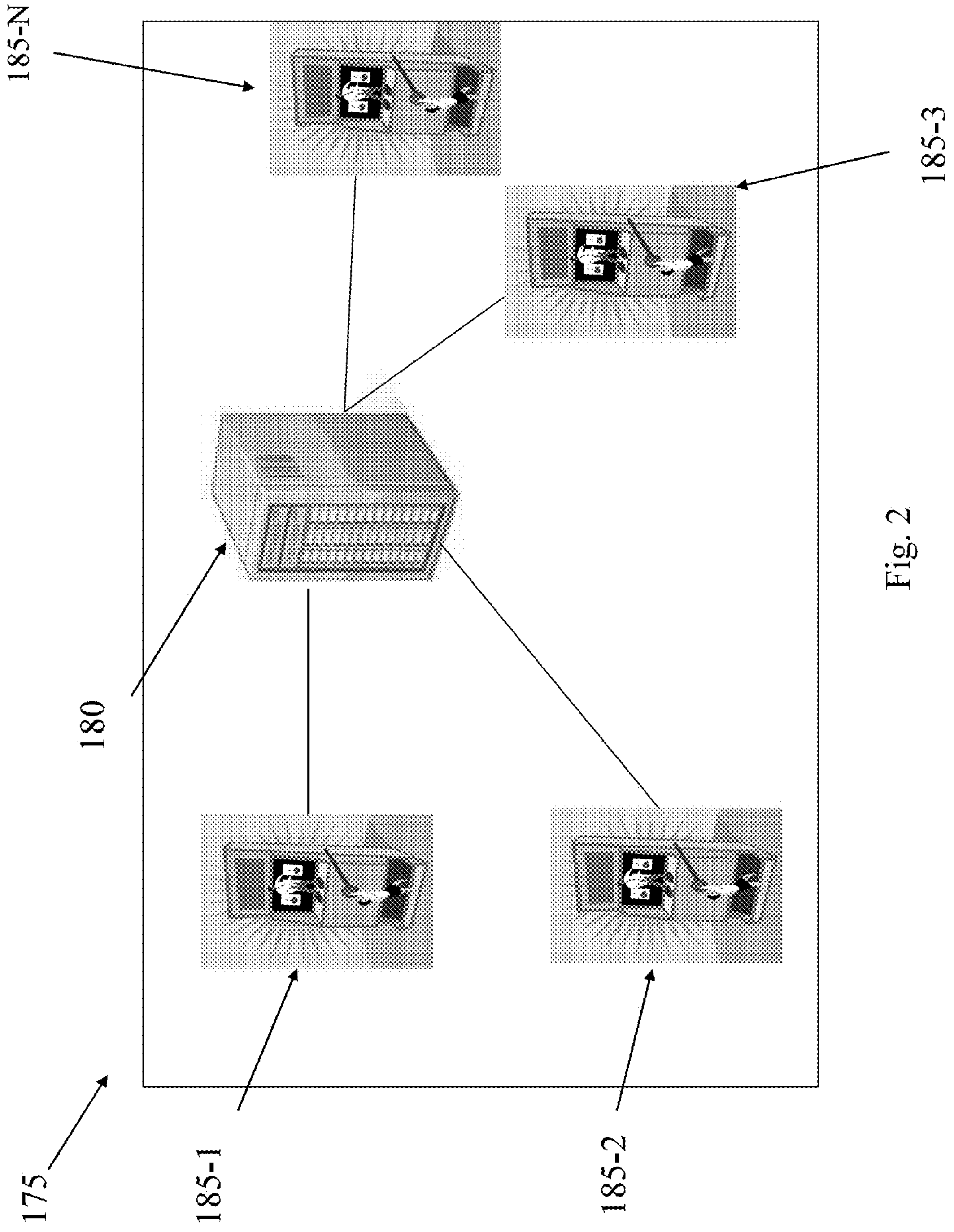
FIG. 2 illustrates a block diagram of a wireless network system including numerous slot machines according to the embodiments of the present invention.

FIG. 2 shows a block diagram of a gaming network 175 which may be used to facilitate play of the game via linked gaming devices according to the embodiments of the present invention. The gaming network 175 comprises a central processor 180 (e.g., processor-equipped game server) in communication with multiple gaming devices 185-1 through 185-N as described in FIG. 1.

Figure 3:
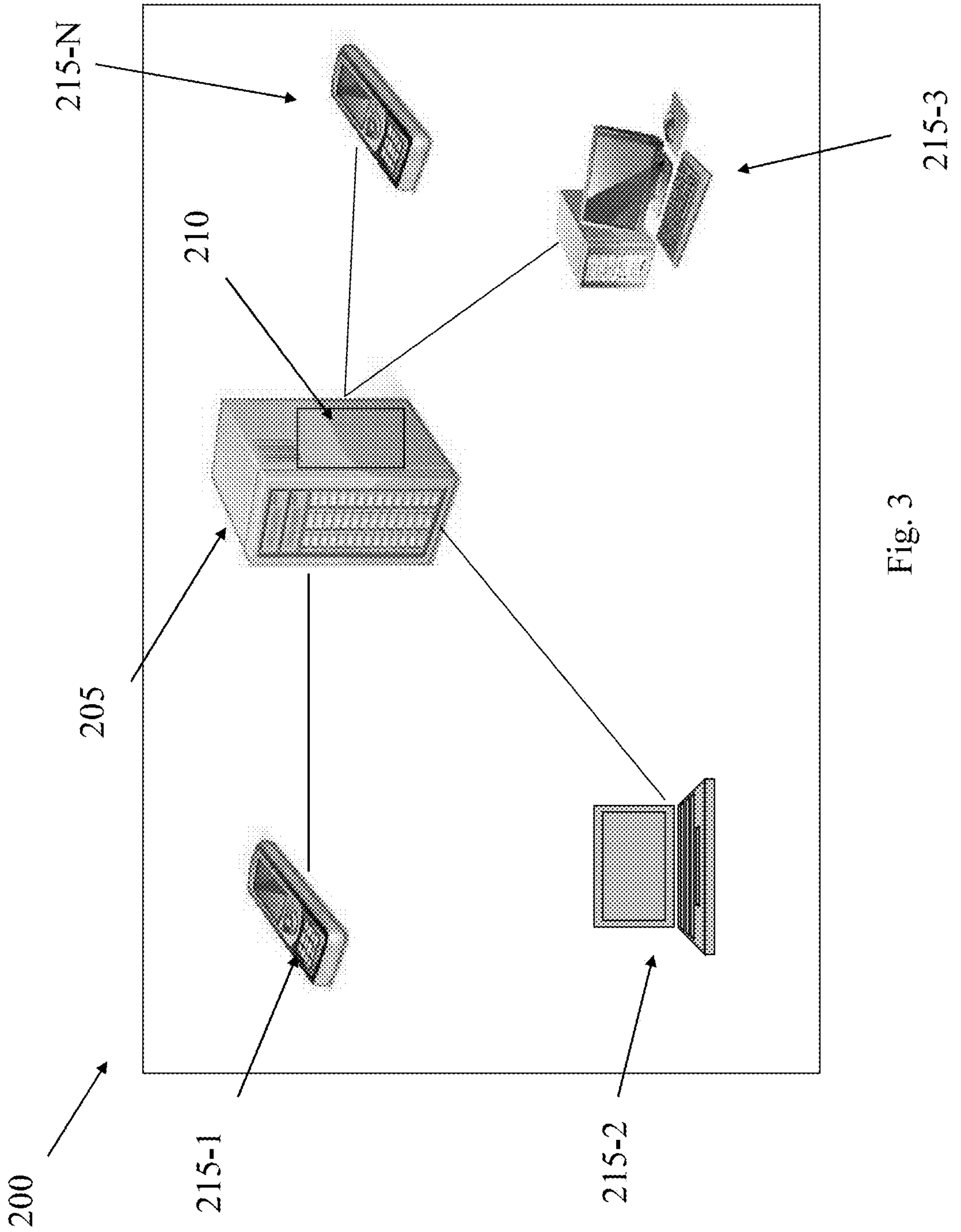
FIG. 3 illustrates a block diagram of a wireless network system accessible by mobile devices for conducting mobile games of chance according to the embodiments of the present invention.

FIG. 3 shows a block diagram of a wireless system 200 which may be used to facilitate remote play of the game according to the embodiments of the present invention. The wireless network system 200 comprises a processor-equipped game server 205, including one or more processors 210 running game software, and remote devices 215-1 through 215-N (e.g., smart phones) configured to access said game server 205 facilitating game play on the remote devices 215-1 through 215-N. In another embodiment, the video game according to the embodiments of the present invention may be in the form of a software application ("App") downloadable onto smart phones, tablets or computers and playable via processing power and a user interface associated therewith.

In one embodiment of the present invention, a plurality of gaming devices are connected to one or more servers over a network, such as a wide area network (WAN) and/or a local area network (LAN). In one embodiment, the gaming devices are electronic gaming machines, otherwise known as "slot machines." These may be classified as Class II, Class III, video lottery terminals (VLT), or the like. Electronic gaming machines may present either one or a plurality of games to the player such as video reels, video poker, video keno, video bingo, electronic table games, and the like. In another embodiment, the gaming devices are gaming kiosks or terminals. Alternatively, the gaming devices may include remote gaming devices, for example, cellular phones, laptop or desktop computers, and/or any other suitable devices. The servers may include one or more local servers within a gaming establishment and/or one or more wide area progressive (WAP) servers connected to the local servers and/or to the gaming devices through the network.

In one embodiment, each gaming device presents either one or a plurality of games of chance to a player to enable the player to select and play the games of chance. In addition, each gaming device may include a randomization device, such as a random number generator (RNG) and/or a permutation generator, that is used to play a selected game on the gaming device. The randomization device may be used to randomly determine a game outcome for the game of chance. For example, if the player selects a slot game to be played on a gaming device, the gaming device uses the randomization device to select the symbols which land on each space of the primary game reel matrix. In another embodiment, at least some aspects of the game are provided by one or more servers, such as a local server, a wide area server, a local area progressive server (LAP), or a wide area progressive server (WAP). The server or servers may include a randomization device for randomly selecting the symbols.

In the example of mechanical, electromechanical, or video reel machines, the games may include a number of mechanical or simulated rotating reels that are arranged in a horizontal configuration forming columns or vertical configurations forming rows. One or a number of rows are presented to the player to allow for one or many different winning pay lines. Pay lines may be straight across or designed in any convenient fashion. A typical game many include five reels or columns and three or four rows or the like or a vertical configuration of five rows and three or four columns and the like.

Figure 4:
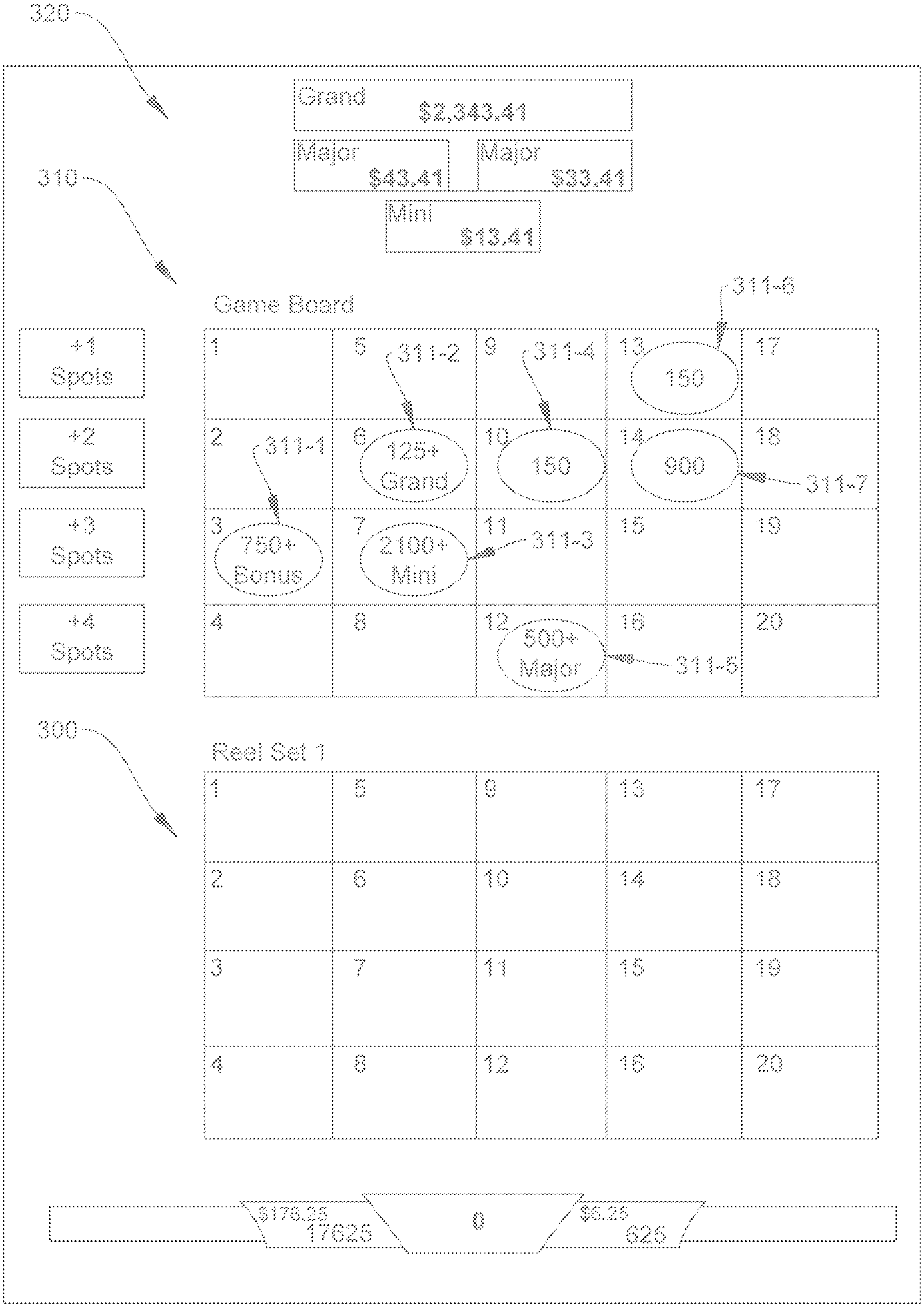
FIG. 4 illustrates a game board populated with symbols according to the embodiments of the present invention.

FIG. 4 shows an exemplary diagram of a primary game reel matrix 300 and game board matrix 310. As shown, the primary game reel matrix 300 and the game board reel matrix 310 are both 4×5 matrices. The primary game reel matrix 300 facilitates the play of a conventional video-based slot game whereby random symbols are positioned in the spaces to determine whether a pattern (along pay lines) thereof results in a prize award. In practice, the primary game reel matrix 300 and the game board reel matrix 310 are graphically depicted on one or more video displays. Certain prizes 320, including progressive prizes, may be depicted on the one or more displays as well. The objective of the game board matrix 310 is to collect and display certain symbols which may lead to an award of a prize as detailed below. In one embodiment, a prize is awarded when 4 symbols occupy vertical (column) or diagonal spaces on the game board matrix 310 or 5 symbols occupy horizontal (row) spaces on the game board matrix 310. When certain symbols appear on the game reel matrix 300 during play of the underlying game, those symbols are positioned in the corresponding space of the game board matrix 310. Consequently, the symbols 311-1 through 311-7 displayed on game board matrix 310 must have previously appeared on the corresponding space of the game reel matrix 300 in order to now be displayed on the game board matrix 310.

Figure 5:
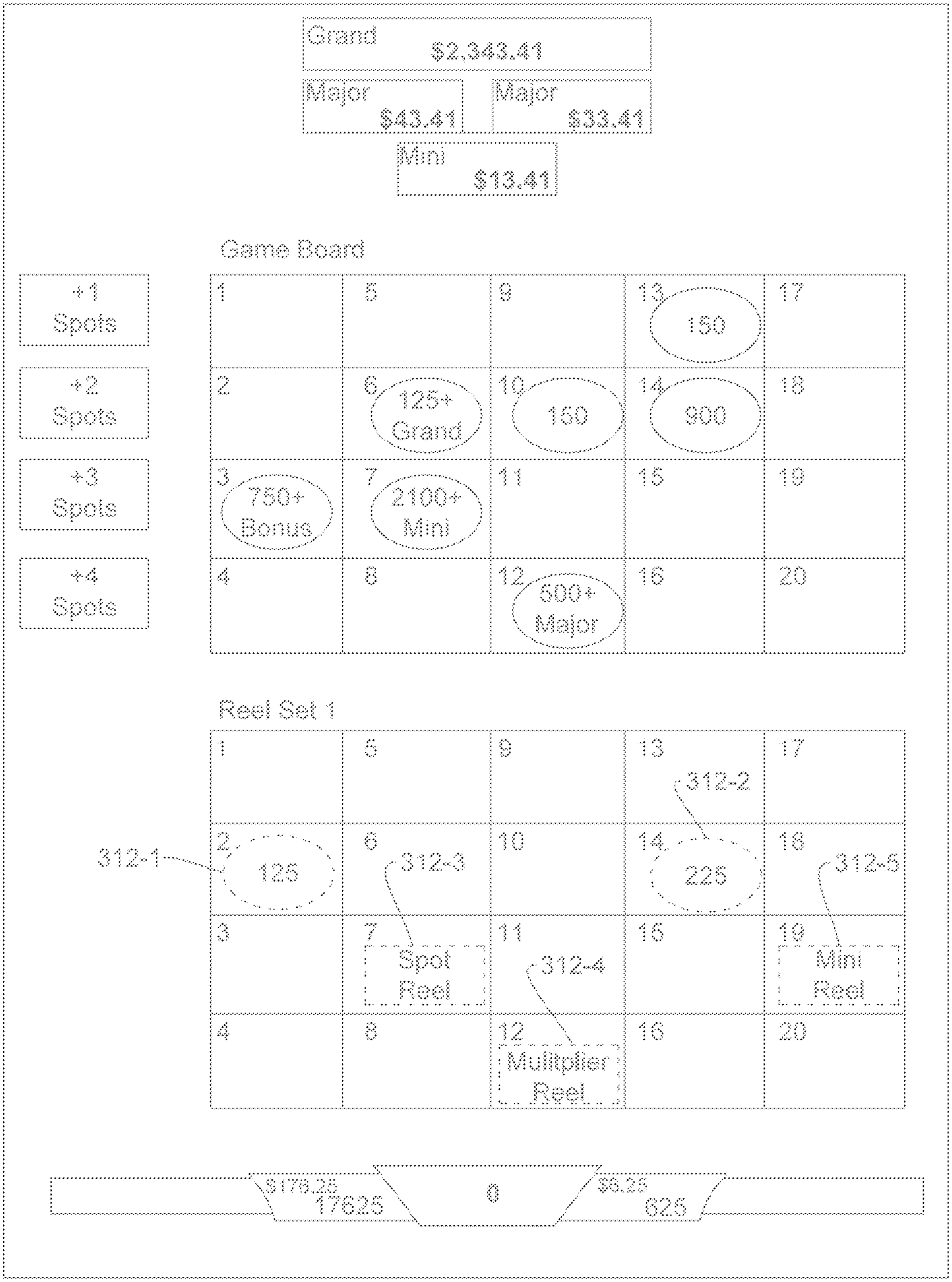
FIG. 5 illustrates a first set of new symbols on the primary game reel matrix according to the embodiments of the present invention.

FIG. 5 shows a first set of new symbols 312-1 through 312-5 displayed on the primary game reel matrix 300 according to the embodiments of the present invention. In practice, the other spaces of the primary game reel matrix 300 are filled with symbols but not pre-established symbols that are moved to the game board matrix 310 but for purposes of focusing on the embodiments of the present invention, the other spaces of the primary game reel matrix 300 are shown blank.

Figure 6:
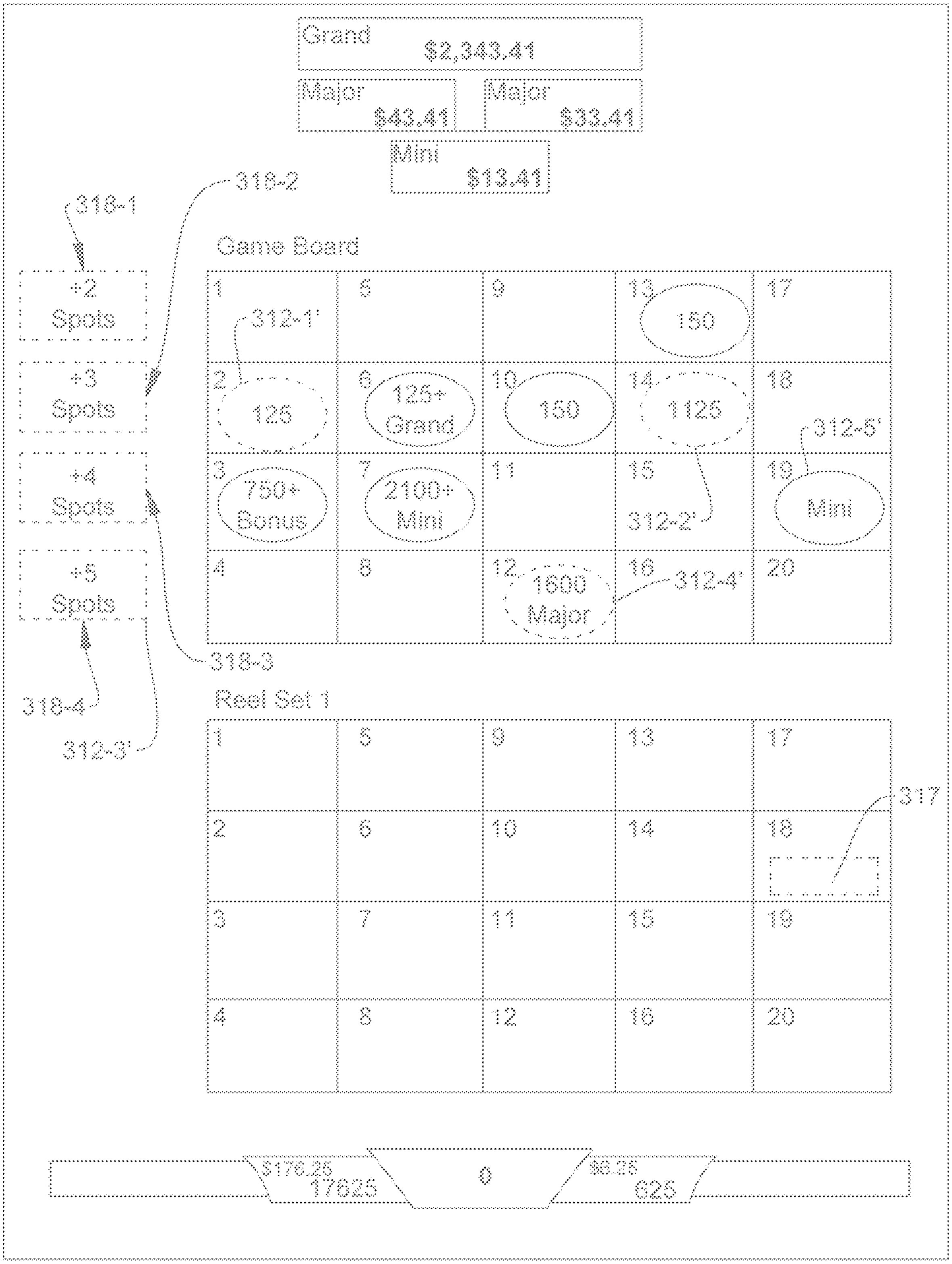
FIG. 6 illustrates the game board after the first set of new symbols from FIG. 5 have been added according to the embodiments of the present invention.

Symbols 312-1 and 312-2 comprise credit awards, symbol 312-3 comprises a spot reel, symbol 312-4 comprises a multiplier and symbol 312-5 a mini reel. FIG. 6 shows the impact of symbols 312-1 through 312-5 on game board matrix 310. Credit award symbol 312-1 causes 125 to be moved to corresponding space 2 312-1' (empty previously) of the game board matrix 310. Credit award symbol 312-2 causes 225 to be moved to corresponding space 14 312-2' and added to the amount already displayed (i.e., 900+

225=1125). Spot reel symbol 312-3 serves to add a free spot 312-3' to each row of free spot icons 318-1 through 318-4. Multiplier symbol 312-4 causes any amounts in the corresponding space of the game board matrix 310 to be multiplied by a random or pre-determined amount (e.g., 2*x*, 3*x*, etc.). Thus, the 500 in space 12 312-4' of the game board matrix 310 is doubled to 1000. The Mini symbol 312-5 moves to corresponding space 19 312-5' in the game board matrix 310. The Mini symbol 312-5 relates to one of the progressive awards.

The movement of the 125 into space 2 of the game board matrix 310 creates a near win with 4 symbols occupying row 2 of the game board matrix 310. To alert the player that a near win condition is present, space 18 317 of the primary game reel matrix 300 remains highlighted such that the player knows that when a pre-established symbol appears in space 18 of the primary game reel matrix 300 a game board matrix 310 prize will be awarded.

Figure 7:
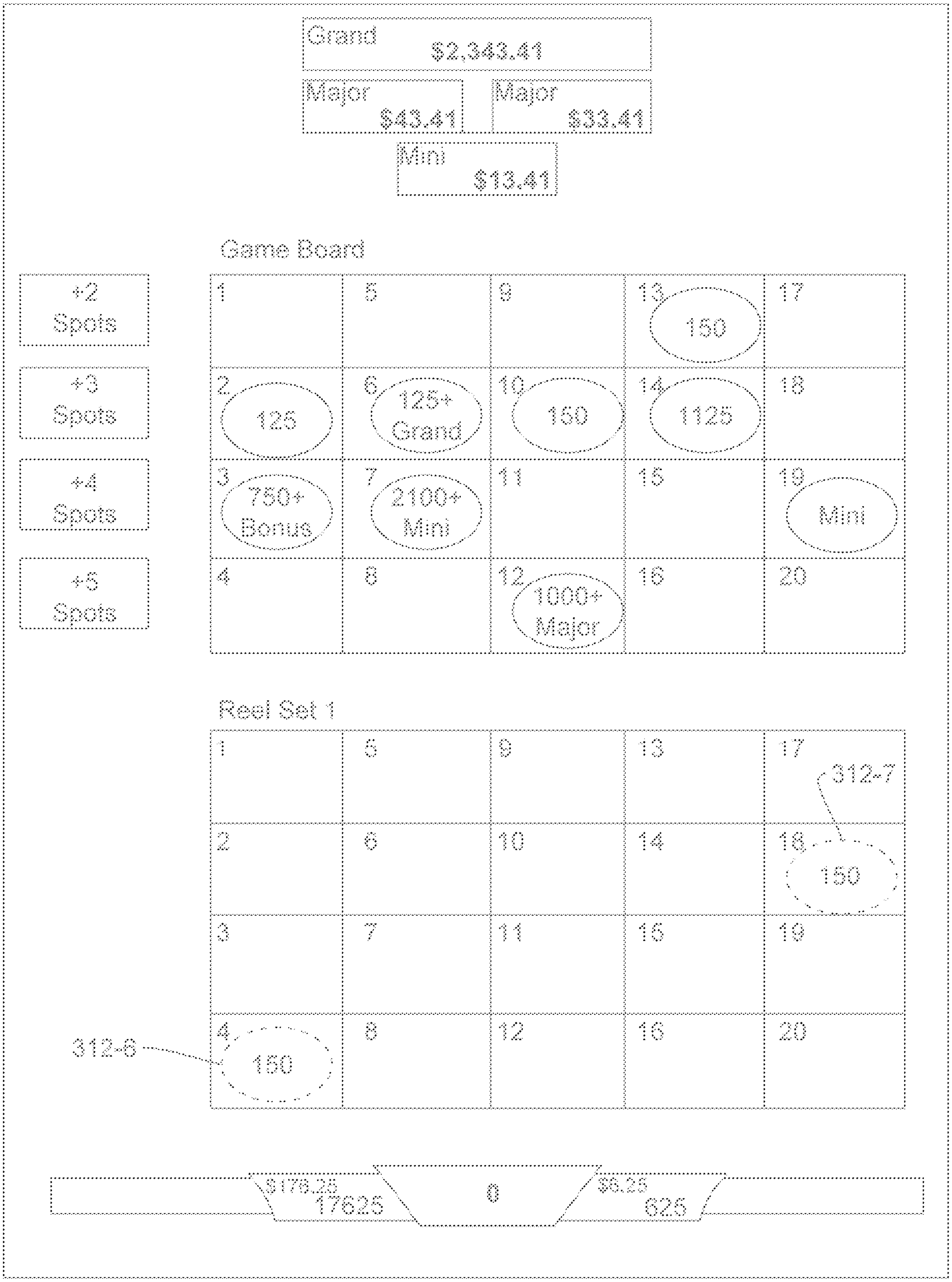
FIG. 7 illustrates a second set of new symbols on the primary game reel matrix according to the embodiments of the present invention.
Figure 8:
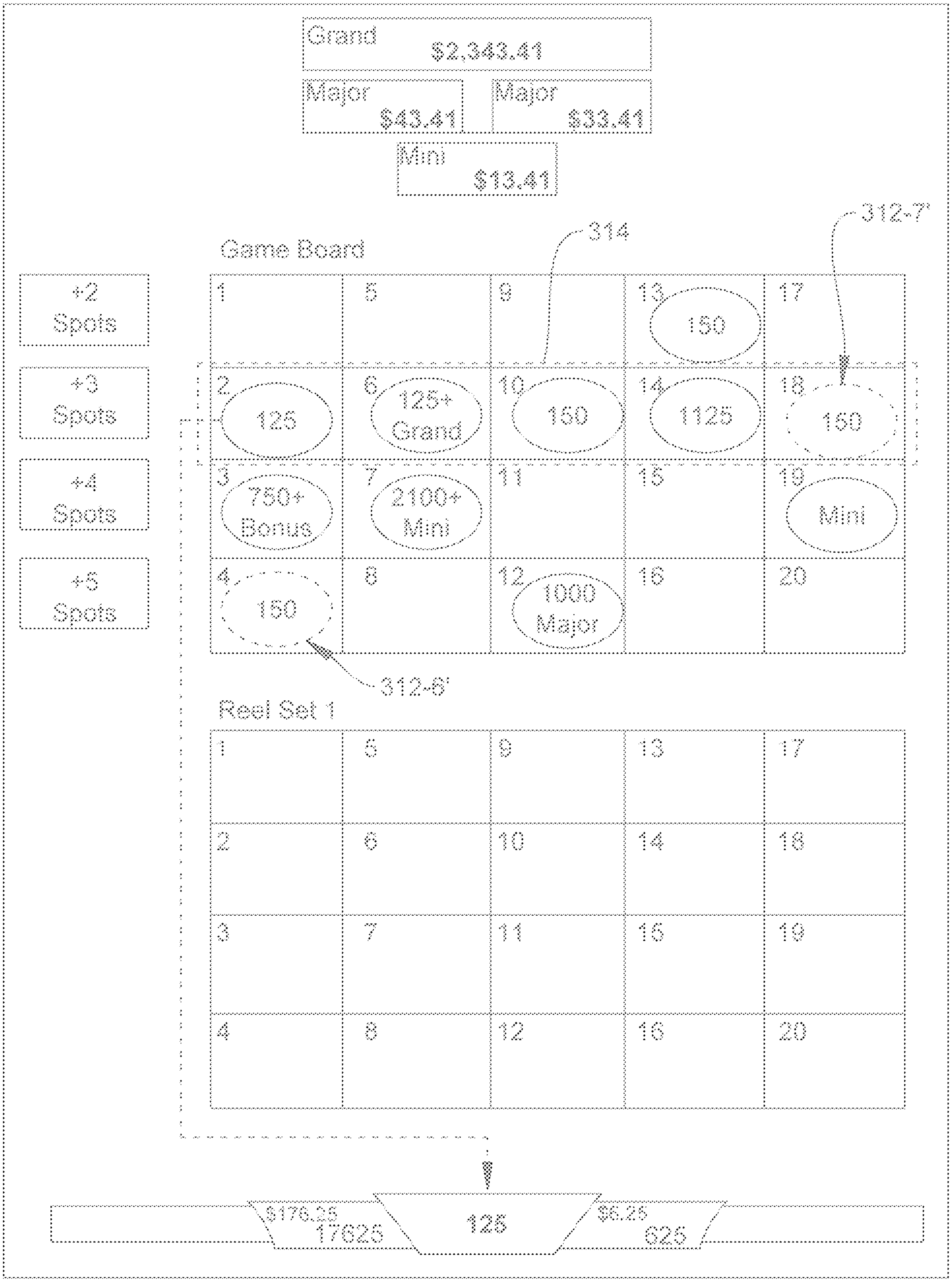
FIG. 8 illustrates the game board after the second set of new symbols from FIG. 7 have been added according to the embodiments of the present invention illustrates an exemplary kiosk of the type that may be used to facilitate the embodiments of the present invention.
Figure 9:
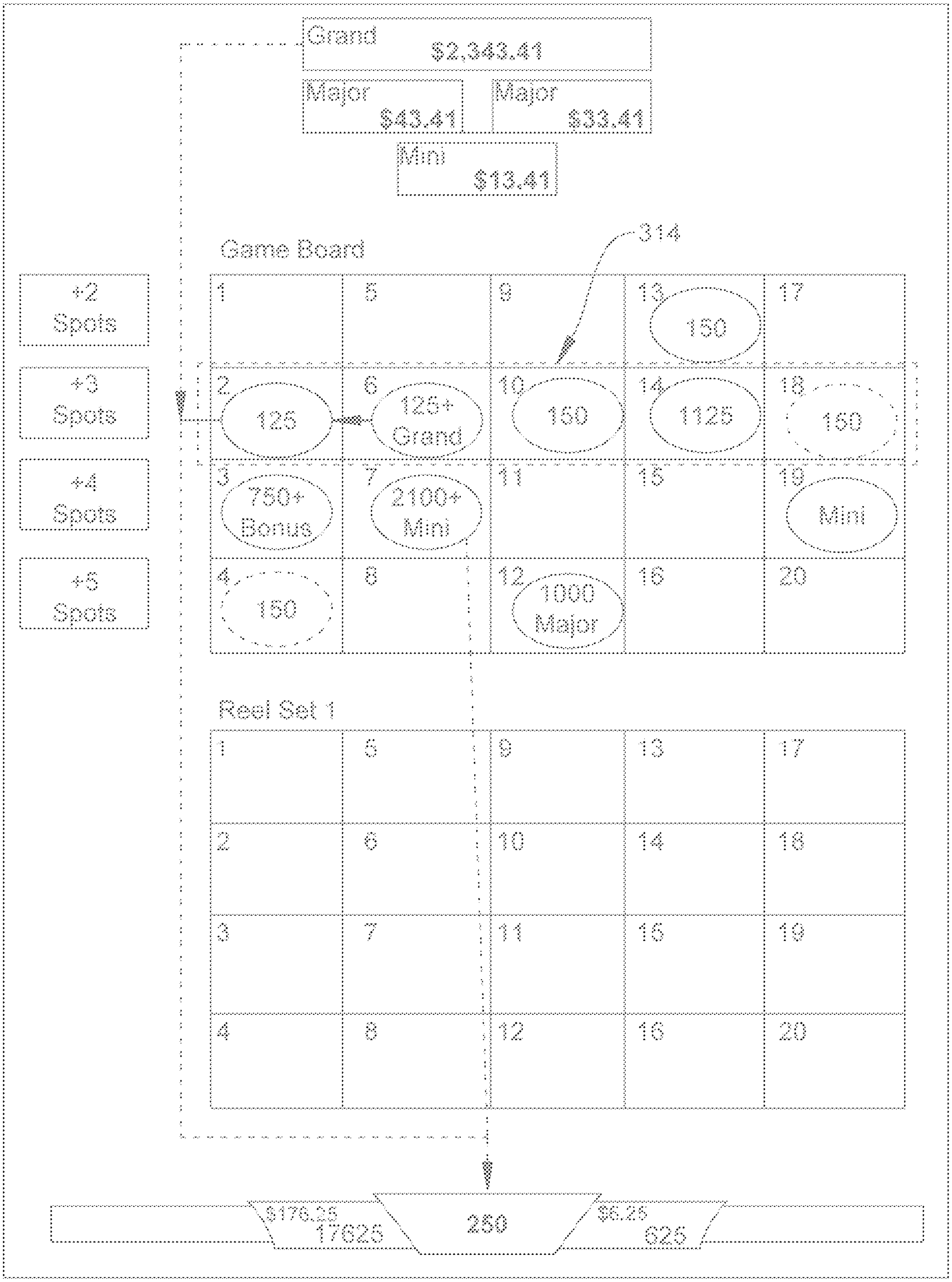
FIG. 9 illustrates a payout based on the second set of new symbols being added to the game board according to the embodiments of the present invention.

FIG. 7 shows a second set of new symbols 312-6 and 312-7 displayed on the primary game reel matrix 300 according to the embodiments of the present invention. Symbols 312-6 and 312-7 both comprise credit awards of 150. As shown in FIG. 8, credit symbol 312-6 causes 150 to move to space 4 312-6' on the game board matrix 310 while credit symbol 312-7 causes 150 to move to space 18 312-7' on the game board matrix 310. The movement of 150 into space 18 of the game board matrix 310 means row 2 of the game board matrix 310 is full of symbols resulting in a winning outcome (i.e., 5 horizontal symbols) as identified by the highlighted border 314. In one embodiment, as depicted in FIG. 9, the winning outcome causes a prize to be awarded based on each of the symbols forming the winning outcome. In this instance, the row spaces (2, 6, 10, 14 and 18) 314 display 125, 125+Grand, 300, 1125 and 150. Accordingly, the aggregate prize is 1825 units (or coins) (125+125+300+1125+150) plus $2,343.41 (the Grand Progressive Prize).

Figure 10:
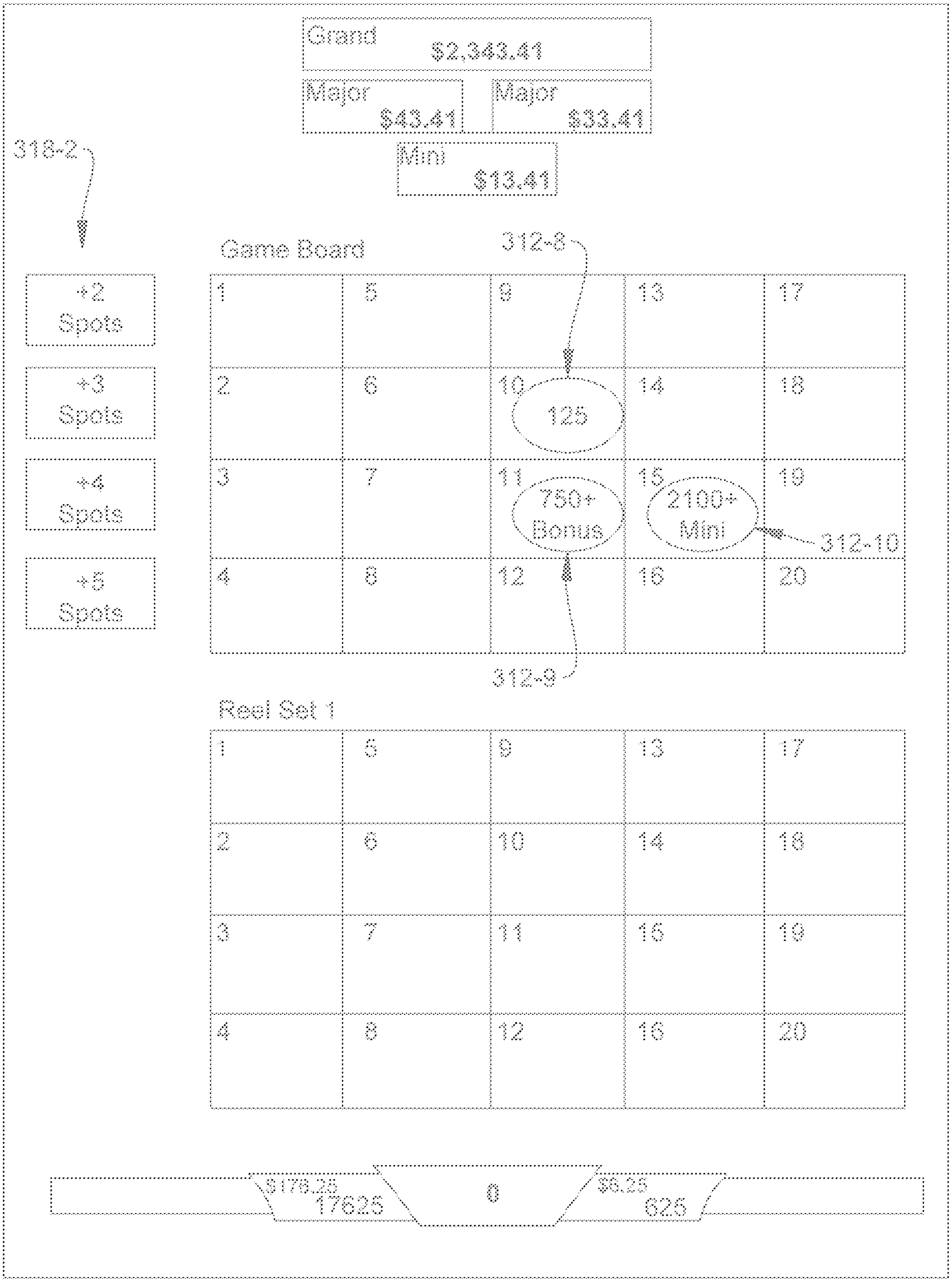
FIG. 10 illustrates game board spaces cleared after the payout in FIG. 9 is completed according to the embodiments of the present invention.

FIG. 10 shows the game board matrix 310 has been cleared of all previous symbols responsive to the winning outcome. Thereafter, based on the winning outcome being associated with row 2 of the game board matrix 310, 3 random spaces as identified by the +3 spots icon 318-2 are filled with random new symbols 312-8 through 312-10 to start a new game board matrix 310. As shown, spaces 10, 11 and 15 of the game board matrix 310 have been pre-populated with a 125 credit award symbol 312-8, 750+ Bonus symbol 312-9 and 2100+Mini symbol 312-10.

Figure 11:
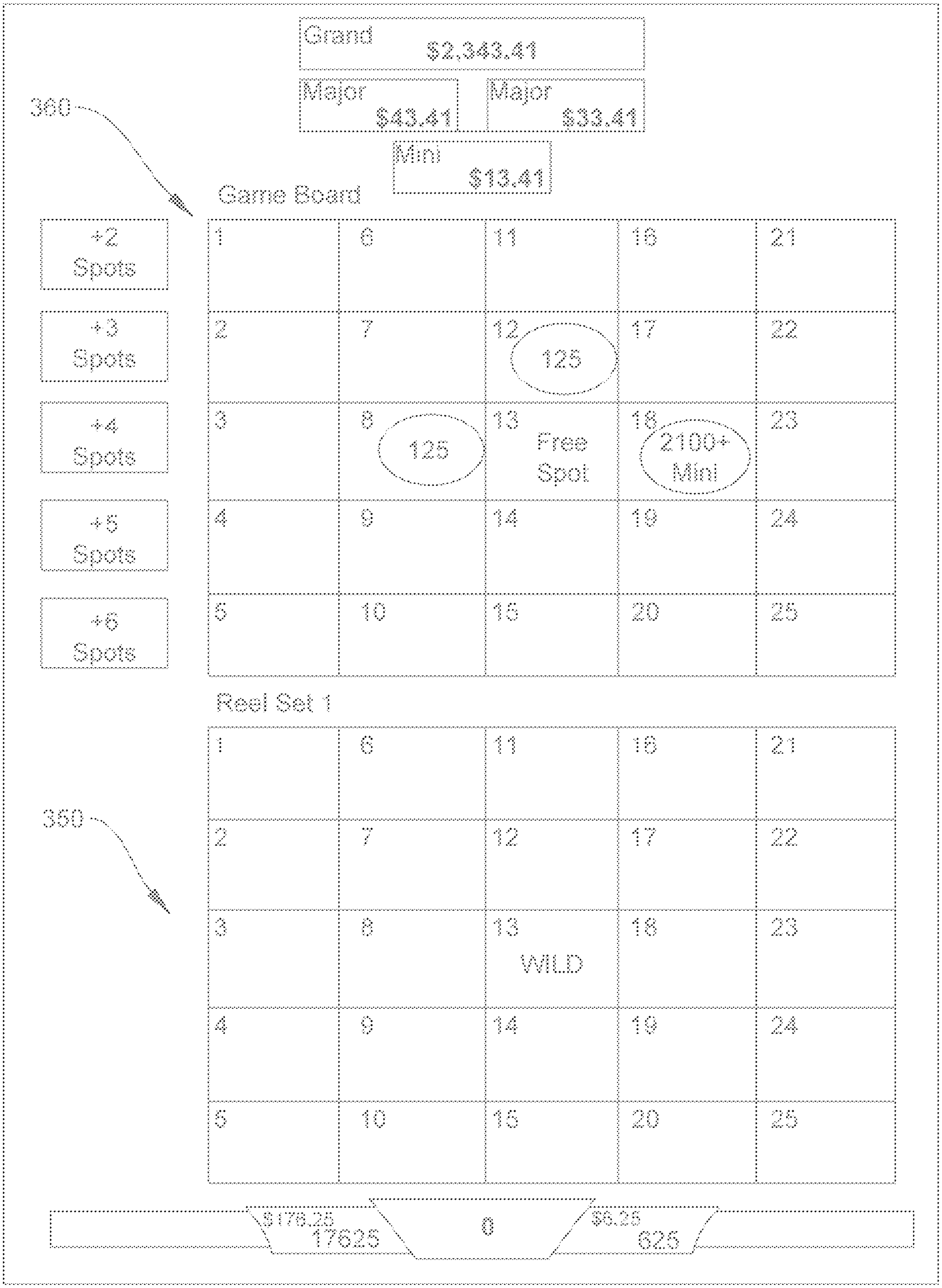
FIG. 11 illustrates a gaming machine configuration based on a 5×5 matrix according to the embodiments of the present invention.

FIG. 11 shows a primary game reel matrix 350 and game board matrix 360 formed of 5×5 matrices. In one embodiment, with the 5×5 matrices, space 13 of the game board matrix 360 may display a FREE SPOT while space 13 on the primary reel game matrix 350 is populated with a WILD space to prevent any special symbols appear thereon.

Figure 12:
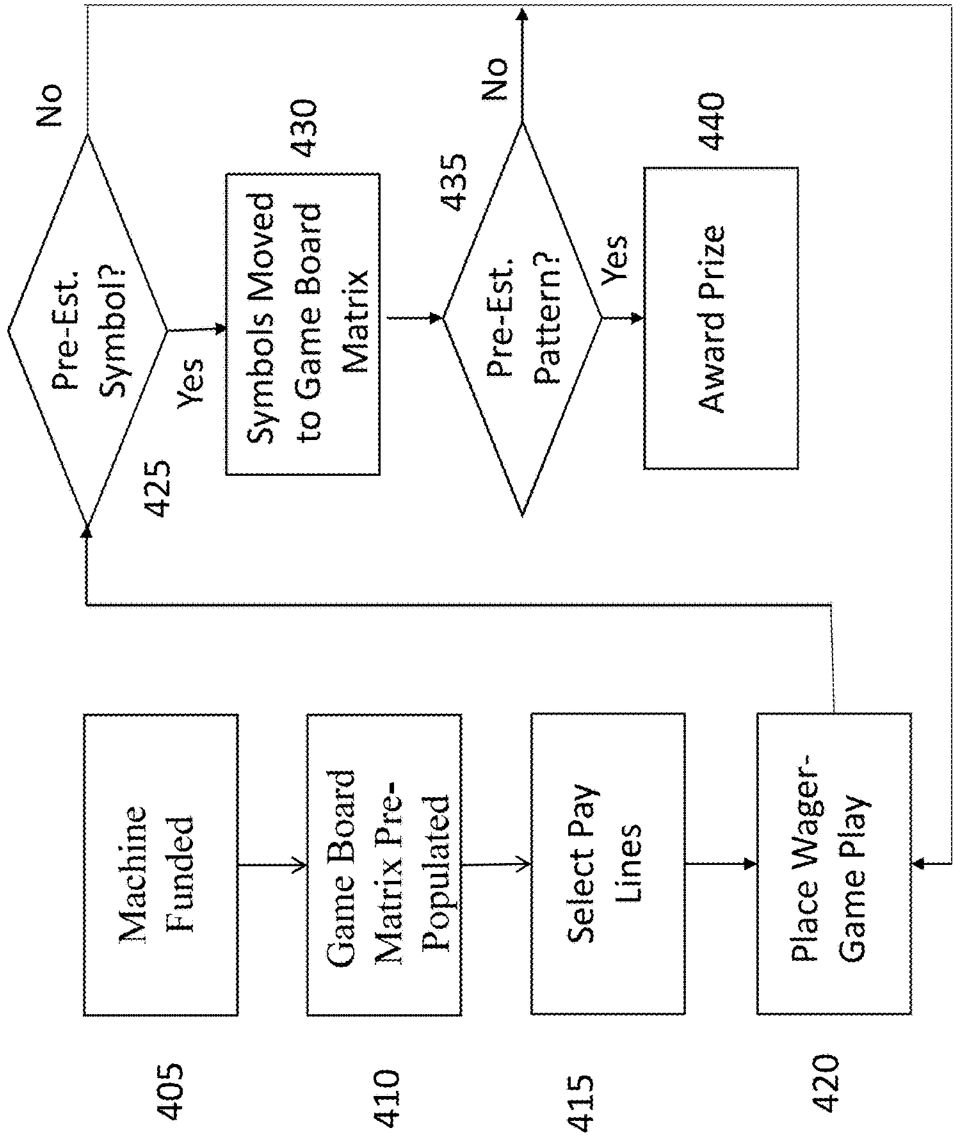
FIG. 12 illustrates a flow chart detailing one methodology according to the embodiments of the present invention.

FIG. 12 shows a flow chart 400 detailing one methodology for conducting a game of chance according to the embodiments of the present invention. At 405, the player funds the electronic gaming machine using cash, vouchers, coupons or cashless transfer. At 410, the game board matrix is pre-populated with random symbols in random spaces. Alternatively, the game board matrix may begin with no symbols displayed. At 415, the player selects the number of pay lines to play on the primary game reel matrix. The number of possible pay lines is a function of the primary game reel matrix. The casino may set the number of possible pay lines less than the maximum number of pay lines. At 420, the player places a wager and triggers the slot machine to randomly display game symbols in each space of the primary game reel matrix. The number and types of symbols are limitless. With the embodiments of the present invention, certain pre-established game symbols trigger activity on the game board matrix. In one embodiment, the pre-established symbols are moved to, or impact, a corresponding space on the game board matrix. As detailed above, the pre-established symbols may be credit award symbols, multiplier symbols, spot reel symbols, progressive symbols, etc. Those skilled in the art will recognize that the pre-established symbols can take any form and function relative to the game board matrix. At 425, it is determined if any of the symbols appearing on the primary game reel matrix, are pre-established symbols associated with the game board matrix. In one embodiment, for the pre-established symbols to be moved to, or impact, a corresponding space on the game board matrix, the pre-established symbol must appear on active pay line of the primary game reel matrix and/or a minimum amount must be wagered on play of the underlying slot game (e.g., at least $1 per spin or play). Alternatively, any pre-established symbol appearing on any space on the primary reel game matrix is moved to, or impacts, the corresponding space on the game board matrix. If the symbols are of a pre-established type, at 430, each is moved to the game board matrix. At 435, it is determined if the game board matrix has a winning pattern. If so, at 440, a prize is awarded.

Gaming devices described herein may use real money for play or may utilize a credit-based system in which the credits used for the games may or may not have a cash value. Similarly, prizes for the games may be in the form of credits, cash, and/or physical prizes such as televisions, automobiles, or the like.

A "local game" is a game that is played by players within a predetermined location, such as within a single gaming establishment, or players playing the game across a local area network. A "local prize" or a "local payout" (including a local progressive prize or a local progressive payout) is a prize that may be won during a local game.

As used herein, the terms "connect" and "couple" are not limited to only including direct connections. Rather, unless otherwise specified, indirect connections are included within the definitions of "connect" and "couple." For example, two devices may be considered to be connected together even if there are other devices or components connected between the two devices. Any suitable means to connect or couple devices or components together may be used.

A player reward card refers to a physical or electronic card, token, or other device or data that enables a system to identify a player in connection with, among other things, a reward program or campaign. Accordingly, the player reward card may serve to identify the player and may enable gameplay, credits, funds, or other data to be associated with the player. In addition, player card tier levels may be established to denote the level of player play or relative worth to the casino operator.

Although the invention has been described in detail with reference to several embodiments, additional variations and modifications exist within the scope and spirit of the invention as described and defined in the following claims.

I claim:

1. A gaming machine comprising:

a user interface having a display device configured to present a graphical user interface of a game of chance;

a random number generator;

a memory device storing (i) computer-executable instructions and (ii) data indicative of a plurality of video reels, wherein the plurality of video reels include a plurality of primary game symbols;

at least one processor configured to execute the computer-executable instructions related to the game of chance, which, when executed, causes the processor to:

(i) render, using an output from the random number generator, a random primary game outcome on the graphical user interface using said plurality of video reels to form a video reels matrix having a first plurality of symbol positions arranged in a first number of rows and a second number of columns configured to display primary game symbols from the plurality of primary game symbols;

(ii) render on the graphical user interface proximate to said video reels matrix a game board matrix having a second plurality of symbol positions arranged in a same first number of rows and second number of columns as the video reels matrix;

(iii) render on the graphical user interface proximate said game board matrix a plurality of spot icon positions, each of the spot icon positions being associated with a respective row of said game board matrix;

(iv) in response to determining that the random primary game outcome includes one or more pre-established symbols appearing on the first plurality of symbol positions of said video reels matrix, cause actions to trigger in corresponding symbol positions of the second plurality of symbol positions of said game board matrix;

(v) in response to determining that said actions caused one or more pre-established winning conditions to be achieved on said game board matrix:

(a) cause the graphical user interface to present an awarding of a prize associated with the one or more pre-established winning conditions achieved, (b) cause the graphical user interface to remove any symbols displayed by triggered actions in the second plurality of symbol positions of said game board matrix;

(c) determine a value of each spot icon position associated with the one or more pre-established winning conditions achieved; and (d) cause the graphical user interface to re-populate a quantity of the second plurality of symbol positions of said game board matrix with new symbols, wherein said quantity is based on the determined value of each spot icon associated with the one or more pre-established winning conditions achieved.

2. The gaming machine of claim 1 wherein said actions include displaying symbols representative of a credit amount and/or an award type.

3. The gaming machine of claim 1 wherein said one or more pre-established winning conditions comprise pre-established patterns of symbols representative of an award amount and/or an award type.

4. The gaming machine of claim 3 wherein said pre-established winning conditions comprise a subset of the second plurality of symbol positions any row, column and/or diagonal of said game board matrix being occupied by a symbol.

5. The gaming machine of claim 2 wherein said award type comprises progressive awards.

6. The gaming machine of claim 1 wherein said video reels matrix and said game board matrix are each 4×5 matrices.

7. The gaming machine of claim 1 wherein said processor is further configured to execute computer-executable instructions that cause the processor to: multiply a credit award in a symbol position in said game board matrix responsive to a multiplier symbol appearing in a corresponding symbol position on said video reels matrix.

8. The gaming machine of claim 1 wherein said processor is further configured to execute computer-executable instructions that cause the processor to: place a FREE symbol in a center symbol position of a 5×5 game board matrix.

9. The gaming machine of claim 1 wherein said processor is further configured to execute computer-executable instructions that cause the processor to: responsive to a SPOT award symbol appearing on a symbol position of said video reels matrix, increment a value of said spot icon position associated with a corresponding row of said game board matrix.

10. The gaming machine of claim 1 wherein said prize includes an aggregate of credit awards in symbol positions forming a winning row, column or diagonal of the game board matrix.

11. A gaming machine comprising:

a user interface having a display device configured to present a graphical user interface of a game of chance;

a random number generator;

a memory device storing (i) computer-executable instructions and (ii) data indicative of a plurality of video reels, wherein the plurality of video reels include a plurality of primary game symbols;

at least one processor configured to execute the computer-executable instructions related to the game of chance, which, when executed, causes the processors to:

(i) render, using an output from the random number generator, a random primary game outcome on the graphical user interface using said plurality of video reels to form a video reels matrix having a first plurality of symbol positions arranged in a first number of rows and a second number of columns configured to display primary game symbols from the plurality of primary game symbols;

(ii) render on the graphical user interface proximate to said video reels matrix a game board matrix having a second plurality of symbol positions arranged in a same first number of rows and second number of columns as the video reels matrix;

(iii) render on the graphical user interface proximate said game board matrix a plurality of spot icon positions, each of the spot icon positions being associated with a respective row, column, or diagonal of said game board matrix;

(iv) in response to determining that the random primary game outcome includes one or more pre-established symbols appearing on the first plurality of symbol positions of said video reels matrix, displaying game board symbols representative of a credit amount and/or an award type in corresponding symbol positions of the second plurality of symbol positions of said game board matrix; and (iv) in response to determining that any row, column or diagonal of symbol positions of said game board matrix being filled with symbols:

(a) cause the graphical user interface to present an awarding of a prize associated with said any row, column, or diagonal of symbol positions being filled with symbols, wherein the prize is based on an aggregate of values associated with symbols in the symbol positions of said any row, column or diagonal of said game board matrix;, (b) cause the graphical user interface to remove any symbols displayed in the second plurality of symbol positions of said game board matrix;

(c) determine a value of each spot icon position associated with said any row, column, or diagonal being filled with symbols of said game board matrix; and (d) cause the graphical user interface to re-populate a quantity of the second plurality of symbol positions of said game board matrix with new game board symbols, wherein said quantity is based on the determined values of each spot icon associated with said any row, column, or diagonal being filled with symbols said game board matrix.

12. The gaming machine of claim 11 wherein said prize further comprises progressive awards.

13. The gaming machine of claim 11 wherein said video reels matrix and said game board matrix are each 4×5 matrices.

14. The gaming machine of claim 11 wherein said processor is further configured to execute computer-executable instructions that cause the processor to: multiply a credit award in a symbol position in said game board matrix responsive to a multiplier symbol appearing in a corresponding symbol position on said video reels matrix.

15. A method comprising:

utilizing at least one processor configured to execute computer-executable instructions related to a game of chance;

utilizing one or more display devices configured to render a graphical user interface presenting (i) a video reels matrix having a first number of rows and a second number of columns defining a first plurality of symbol positions, (ii) game board matrix, approximate the video reels matrix, having a same first number of rows and a same second number of columns as the video reels matrix defining a second plurality of symbol positions, and (iii) a plurality of spot icon positions proximate said game board matrix, wherein each spot icon position is associated with a respective row, column, or diagonal of said game board matrix;

utilizing a user interface configured to receive inputs related to the game of chance;

utilizing memory in communication with said at least one processor, wherein said memory stores said computer-executable instructions; and executing, by said processor the computer-executable instructions, which cause the processor to:

(i) render, using an output from a random number generator, random primary game outcome on the graphical user interface, the random primary game outcome comprising a plurality of primary game symbols displayed on said video reels matrix;

(ii) in response to determining that random primary game outcome includes one or more pre-established symbols appearing on the first plurality of symbol positions of said video reels matrix, displaying game board symbols representative of credit amounts and/or award types in corresponding symbol positions of the second plurality of symbol positions of said game board matrix; and (iii) in response to determining that one or more pre-established winning patterns were formed by said game board symbols representing said credit amounts and/or award types on said game board matrix:

(a) cause the graphical user interface to present an awarding of a prize associated with the one or more pre-established winning patterns formed;

(b) cause the graphical user interface to remove any symbols displayed on said game board matrix;

(c) determine a value of each spot icon position associated with the one or more pre-established winning patterns formed; and (d) cause the graphical user interface to re-populate a quantity of said second symbol positions of said game board matrix with new symbols, wherein said quantity is based on the determined value of each spot icon position associated with the one or more pre-established winning patterns formed.

16. The method of claim 15 further comprising, executing, by said processor, computer-executable instructions to cause said processor to: identify said pre-established patterns to comprise all symbol positions forming any row, column and/or diagonal of said game board matrix being occupied by a symbol.

17. The method of claim 15 further comprising executing, by said processor, computer-executable instructions to cause said processor to: utilize award types incorporating progressive awards.

18. The method claim 15 further comprising executing, by said processor, computer-executable instructions to cause said processor to: display said video reels matrix and said game board matrix as 4×5 matrices.

19. The method of claim 15 further comprising executing, by said processor, computer-executable instructions to cause said processor to: multiply a credit award in a symbol position in said game board matrix responsive to a multiplier symbol appearing in a corresponding symbol position on said video reels matrix.

20. The method of claim 15 further comprising executing, by said processor, computer-executable instructions to cause said processor to: responsive to a SPOT award symbol appearing on a symbol position of said video reels matrix, increment a value of said spot icon position associated with a respective row, column, or diagonal of said game board matrix.

* * * * *